United States Patent

Nelson

(10) Patent No.: US 9,373,046 B2
(45) Date of Patent: Jun. 21, 2016

(54) DETECTION SYSTEM FOR COLOR BLIND DRIVERS

(71) Applicant: Continental Automotive Systems, Inc., Auburn Hills, MI (US)

(72) Inventor: Eric Robert Nelson, Canton, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 0 days.

(21) Appl. No.: 14/481,957

(22) Filed: Sep. 10, 2014

(65) Prior Publication Data

US 2016/0070965 A1  Mar. 10, 2016

(51) Int. Cl.
| | |
|---|---|
| *G06K 9/00* | (2006.01) |
| *G06T 7/40* | (2006.01) |
| *G06K 9/46* | (2006.01) |
| *B60W 50/14* | (2012.01) |

(52) U.S. Cl.
CPC ........... *G06K 9/00825* (2013.01); *B60W 50/14* (2013.01); *G06K 9/00805* (2013.01); *G06K 9/46* (2013.01); *G06T 7/408* (2013.01); *B60W 2050/146* (2013.01)

(58) Field of Classification Search
None
See application file for complete search history.

(56) References Cited

U.S. PATENT DOCUMENTS

| | | | | |
|---|---|---|---|---|
| 6,192,341 | B1* | 2/2001 | Becker | G06F 3/04897 345/471 |
| 7,339,149 | B1* | 3/2008 | Schofield | B60Q 1/1423 250/205 |
| 2008/0192151 | A1* | 8/2008 | Ramanath | H04N 9/3114 348/743 |
| 2009/0200958 | A1* | 8/2009 | Doherty | F21V 23/0457 315/291 |
| 2011/0229023 | A1 | 9/2011 | Jones et al. | |
| 2013/0021224 | A1* | 1/2013 | Fujikawa | G02B 27/0101 345/7 |

* cited by examiner

*Primary Examiner* — Stephen R Koziol
*Assistant Examiner* — Amandeep Saini

(57) ABSTRACT

A detection system for vehicle operation according to an exemplary aspect of the present disclosure includes, among other things, at least one camera operable to generate an image and a display unit operable to communicate information on a display. A controller is coupled to the at least one camera. The controller is configured to command the display unit to communicate the information in response to detecting data within the image corresponding to visible light emitted in at least one predetermined frequency range. A controller and a method of detecting a traffic device are also disclosed.

23 Claims, 3 Drawing Sheets

DETECTION SYSTEM FOR COLOR BLIND DRIVERS

BACKGROUND

The present disclosure relates to a detection system, and more particularly, to a detection system situated in a vehicle for the detection of a traffic signal.

Modern automobiles are typically operated by a driver. Some drivers may suffer to some extent from color blindness, such that the driver has difficulty or is unable to observe one or more colors or combinations. For instance, a driver may not be able to detect certain colors presented to the driver during operation of the vehicle. The driver therefore may have difficulty interpreting traffic signals and other devices during operation of the vehicle.

SUMMARY

A disclosed detection system for vehicle operation includes at least one camera operable to generate an image and a display unit operable to communicate information on a display. A controller is coupled to the at least one camera. The controller is configured to command the display unit to communicate the information in response to detecting data within the image corresponding to visible light emitted in at least one predetermined frequency range.

A disclosed controller includes an interface subsystem operable to receive an image from at least one camera and a command subsystem operable to command a display unit to communicate information on a display. A comparison module is operable to generate the information in response to detecting data within the image corresponding to visible light emitted in at least one predetermined frequency range.

A disclosed method of detecting a traffic device includes receiving an image from at least one camera, detecting data within the image corresponding to visible light emitted in at least one predetermined frequency range, and commanding a display unit to communicate information onto a display in response to detecting the data.

Although the different examples have the specific components shown in the illustrations, embodiments of this disclosure are not limited to those particular combinations. It is possible to use some of the components or features from one of the examples in combination with features or components from another one of the examples.

The various features and advantages of this disclosure will become apparent to those skilled in the art from the following detailed description. The drawings that accompany the detailed description can be briefly described as follows.

DETAILED DESCRIPTION

Figure 1:
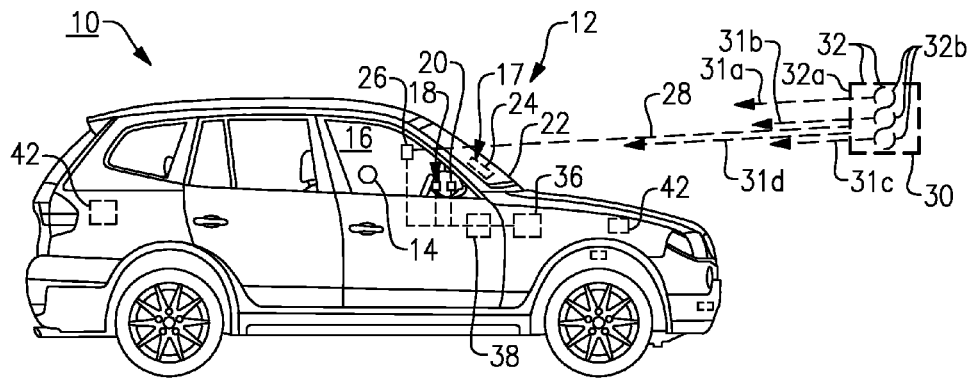
FIG. 1 schematically illustrates a vehicle including a detection system.

FIG. 1 schematically illustrates a vehicle 10 that can include a detection system 12 for providing information to a vehicle occupant 14. The detection system 12 can be positioned, for example, within a passenger cabin 16 of the vehicle 10. The detection system 12 is operable to display information or content relating to a condition or operating state of one or more objects, as discussed in detail below. The information may be presented in the form of one or more images or graphics to the vehicle occupant 14. For instance, the information can be provided in images or graphics indicating one or more conditions of the vehicle 10, such as fuel level, battery level, odometer readings, velocity or a warning. In other examples, the detection system 12 interfaces with a media device operable to provide and display content in the form of navigation data, imagery, radio data or a menu for interfacing with another system of the vehicle 10, or even another system located remotely from the vehicle 10. In other examples, the information relating to a condition or operating state of one or more objects is provided as a separate image, graphic, textual message or audible signal, for example. However, other techniques for presenting the information relating to a condition or operating state of the object of interest can be implementing based on the particular circumstances or operating environment of the detection system 12.

In some examples, the detection system 12 is integrated with an instrument cluster or panel 18 oriented towards the vehicle occupant 14 for presenting various information or content during operation of the vehicle 10. In other examples, the detection system 12 is integrated with a heads-up display unit (HUD) 20. The heads-up display unit 20 is operable to project an image on a display surface 17, such as a display screen 24, to be observed by the occupant 14 during operation of the vehicle 10. In some examples, the display surface 17 is situated adjacent to the windshield 22 for projecting information onto the display screen 24. In other examples, the windshield 22 or another component of the vehicle 10 provides the display surface 17. Other arrangements of the heads-up display unit 20 and the display surface 17 are contemplated.

The detection system 12 interfaces with at least one camera 26. Each camera 26 can be an analog or digital device operable to generate images. At least one camera 26 is arranged with respect to the vehicle 10 such that the camera defines a field of view or a vector 28. In some examples, at least one camera 26 is arranged to orient vector 28 towards an expected position of at least one object 30, such that the vector 28 intersects the object 30 when the object 30 is present in the field of view of the camera 26. The object 30 emits at least one waveform 31 which is observable by the at least one camera 26.

Each object 30 can be characterized by various arrangements and can be associated with the emission of waveform(s) at one or more frequencies. In some examples, the object 30 can include a traffic device actively or passively emitting visible light having one or more colors. Traffic devices encountered during operation of the vehicle 10 can include traffic lights, traffic signs and line markers disposed on road surfaces, for example. The object 30 can be characterized by one or more features or components 32 each having a particular geometry or pattern. For example, a typical traffic light is characterized by a generally rectangular housing $32_a$ and three circles $32_b$ arranged along a common plane. In another example, the object 30 includes a feature of another vehicle (not shown) emitting a visible waveform such as from a taillight or turn signal. In other examples, the object 30 is a light source carried by a pedestrian or a garment worn by the pedestrian. Many different objects emitting radiation at one or more frequencies can be encountered by the vehicle occupant 14 and are therefore contemplated with the teachings of this disclosure.

In some examples, the detection system 12 is coupled, either wired or wirelessly, to another digital system on-board the vehicle 10, such as a vehicle controller 36 operable to perform various system tasks. In other examples, the detection system 12 is a standalone device. The detection system 12 can be installed and/or configured during or after vehicle assembly. Other systems may benefit from the teachings of this disclosure, including other ground based systems, aircraft systems, handheld mobile devices and other computing devices.

Figure 2:
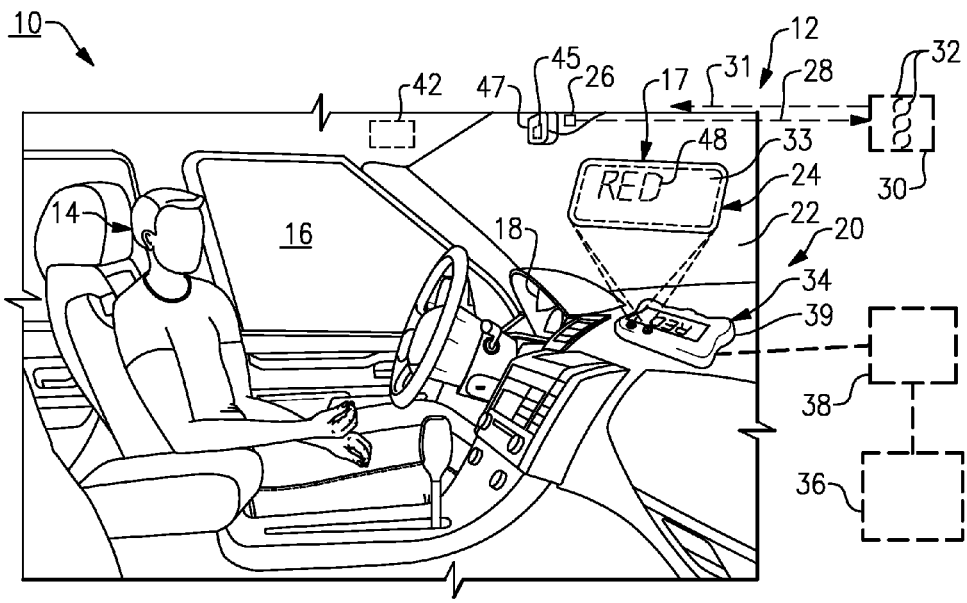
FIG. 2 schematically illustrates a perspective view of a vehicle compartment including an exemplary detection system.
Figure 3:
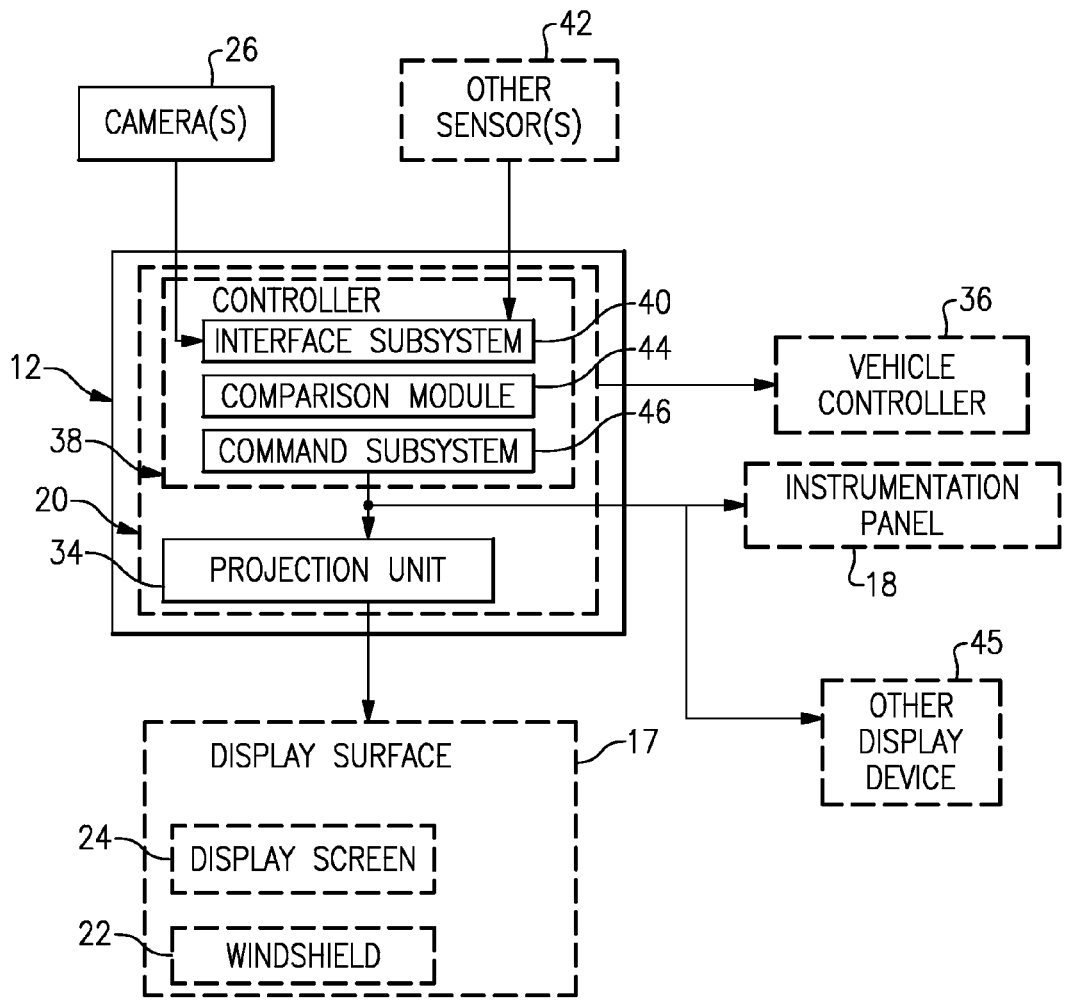
FIG. 3 is a schematic view of the detection system of FIG. 2.

FIG. 2 illustrates a schematic view of the detection system 12 provided in a passenger cabin 16, such as the vehicle 10 of FIG. 1. FIG. 3 illustrates a highly schematic view of the detection system 12. In some examples, the detection system 12 includes the heads-up display unit 20. The heads-up display unit 20 is operable to project an image 33 or content at a location that is observable by the occupant 14 or operator of the detection system 12. The heads-up display unit 20 includes a projection unit 34 positioned adjacent to the windshield 22 for projecting the image 33 onto the display surface 17.

The display surface 17 includes any suitable surface for projecting the image 33. The display surface 17 can be provided by the windshield 22, a film or other layer overlaying, integrated into, or otherwise conforming to the windshield 22 and spans selected portions of the windshield 22. In some examples, a display screen 24 is a separate structure providing the display surface 17 adjacent to the windshield 22 or at another location of the vehicle 10. It should be appreciated that the display surface 17 can be any suitable surface and material for projecting the image 33, including a side window or side minor (not shown).

The detection system 12 includes a controller 38 operable to generate the image 33. The controller 38 can be located within a housing 39 of the projection unit 34, or another suitable location. The controller 38 is electrically coupled, either wired or wirelessly, to the projection unit 34 to command the projection unit 34 to project the image 33 or other information onto the display surface 17. In further examples, the controller 38 augments the image 33 to include other content provided by another system, including the vehicle controller 36.

As illustrated in FIG. 3, the controller 38 includes one or more subsystems to detect a condition or state of object(s) encountered during operation of the detection system 12. These subsystems can be implemented by hardware and/or software depending on the particular circumstances. The controller 38 includes an interface subsystem 40 in communication with at least one camera 26. The camera 26 is operable to provide an image to the controller 38 at the interface subsystem 40. Interface subsystem 40 can also be coupled to other sensors 42 operable to measure data relating to objects 30 encountered during operation of the vehicle 10. In some examples, the other sensors 42 can include a proximity sensor operable to detect the presence and/or distance of objects 30.

The controller 38 includes a comparison module 44 to evaluate each image captured and provided by the camera 26. In some examples, the controller 38 is programmed with at least one filtering algorithm or library to isolate data within the image in at least one predetermined frequency or frequency range. The filtering algorithm includes one or more low-pass filters, high-pass filters, and band-pass filters, for example, although other filtering techniques are contemplated. The at least one predetermined frequency range corresponds to object(s) expected to passively or actively emit radiation at the at least one predetermined frequency range. For instance, the object 30 can emit electromagnetic radiation within the visible spectrum which is observed by the occupant 14, such as red, yellow and/or green light emitted by a traffic light. The visible spectrum includes visible light or wavelengths detectable by the human eye, and are within a range between approximately 390 nanometers (nm) to approximately 750 nm. These wavelengths correspond to frequencies between approximately 400 terahertz (THz) to approximately 790 THz. It is contemplated, however, that the detection system 12 can be utilized to detect objects emitting radiation at other wavelengths and/or frequencies, including other wavelengths in the electromagnetic spectrum. For example, the object 30 may emit infrared radiation which is detectable by the detection system 12. In further examples, the object 30 includes one or more features or components 32 each emitting electromagnetic radiation at a different frequency or a range of frequencies, such as waveforms $31_a$, $31_b$, $31_c$ actively emitted by the components 32 and waveform $31_d$ passively emitted by one of the components 32 (shown in FIG. 1). In one example, waveforms $31_a$, $31_b$, $31_c$ corresponds to three lights having different colors (e.g., red, yellow and green), and waveform $31_d$ corresponds to a housing of a traffic light. The filtering algorithm is able to filter out other waveforms emitted by other objects encountered by the vehicle 10 which are not associated with the frequency of interest, such as business signage.

The controller 38 can also be programmed with at least one image recognition algorithm or library operable to detect an object within each image generated and provided by each camera 26. In some examples, the algorithm is an edge detection or pattern recognition algorithm. These libraries, for example, allow the controller 38 to detect one or more geometric features within the image provided by the camera 26, including features or components 32 of each object 30. In further examples, the controller 38 is operable to detect a distance and/or orientation of the object 30 relative to the detection system 12.

The controller 38 accesses one or more object profiles stored in at least one data library and associated with typical or expected geometries and other characteristics of objects 30 that the detection system 12 may encounter. These objects may include, for example, traffic devices such as traffic lights, traffic signs, and lane markers. Other objects can include hardware provided on other vehicles, such as light bars mounted to an emergency vehicle, or vehicle configurations having painted surfaces. Of course, many other objects are contemplated can be considered by the detection system 12 utilizing techniques of this disclosure. Each object profile is associated with at least one frequency which may be accessed by the controller 38 during execution of the filtering algorithm.

The controller 38 also includes a command subsystem 46. In some examples, the command subsystem 46 is operable to command or otherwise instruct the projection unit 34 to project information onto the display surface 17. In other examples, the command subsystem 46 is operable to command an instrumentation panel 18 to present the information in response to detecting the object 30. In yet other examples, the controller 38 is operable to command another display device 45 to present the information to the vehicle occupant 14. For example, the other device 45 can be a screen provided within a rearview minor 47 or a side minor (not shown). Of course, there are other ways the controller 38 can present the information to the occupant 14, such as by providing a signal to a warning light, digital or analog gauge, or audible device. In further examples, the command subsystem 46 reports an operating state of a traffic signal to the driver or occupant 14 as part of the instrumentation, such as the heads-up display unit 20, by text and/or other methods that do not depend on color in order to inform the driver or occupant 14 of the state of the traffic signal. For example, the command subsystem 14 can generate images including the information as a textual message or word 48 (shown in FIG. 2), such as green, yellow or red, within the instrumentation of the vehicle 10. In another example, the command system 14 provides a signal to the instrumentation of the vehicle 10, such as an audible device, corresponding to an operating state of a traffic signal or device.

The controller 38 typically includes a processor, a memory and an interface. The processor may, for example only, be any type of known microprocessor having desired performance characteristics. The memory may, for example only, includes UVPROM, EEPROM, FLASH, RAM, ROM, DVD, CD, a hard drive, or other computer readable medium which may store data and the detection algorithm 60 for operation of the detection system 12 as described herein. The interface facilitates communication with the other systems or components of the vehicle 10. In some examples, the controller 38 may be a portion of the vehicle control 36, another system, or a stand-alone system.

Figure 4:
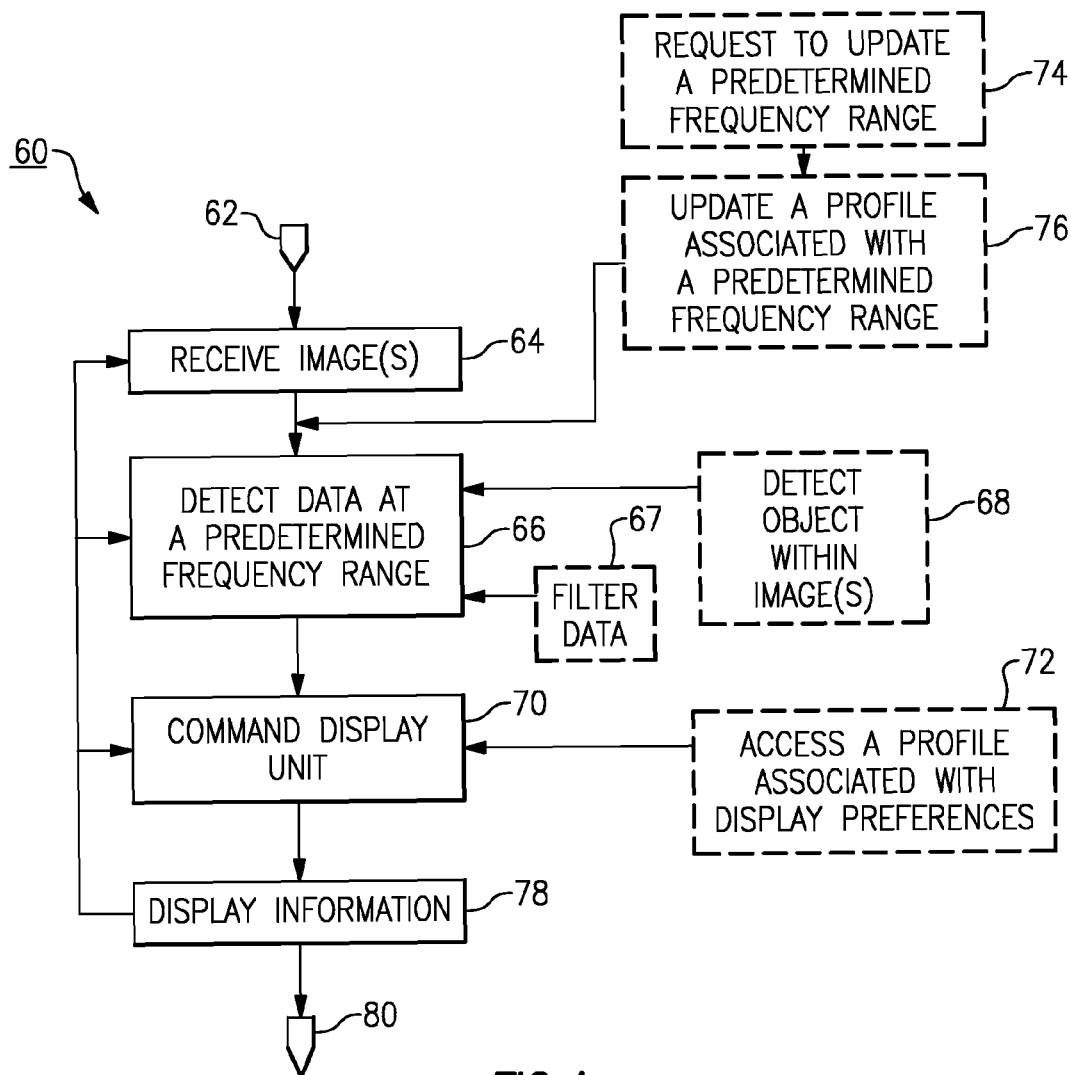
FIG. 4 is a flowchart of a detection algorithm for a detection system.

With reference to FIG. 4, operation of a detection system 12 is performed through a detection algorithm 60 which is operable to detect the object 30 and an operating state or condition thereof, based on images provided by the camera 26 and/or data from other sensors 42. The functions of the detection algorithm 60 are disclosed in terms of functional blocks. It should be understood by those skilled in the art with the benefit of this disclosure, that these functions may be enacted in either dedicated hardware circuitry or program software capable of execution in a microprocessor based electronics controlled embodiment, such as a controller 38, or a combination thereof. In other examples, the detection algorithm 60 can be implemented at least in part by one or more analogue devices. Other implementations of the detection algorithm 60 are contemplated, including another system or devices than the detection system 12 as situated in the vehicle 10. Operation of the detection algorithm 60, as executed by the controller 38, will be discussed for purposes of illustration below and should not be construed to be limiting.

Upon system initialization at block 62, the algorithm 60 then moves to a ready state, and receives at least one image from the camera 26 at block 64. At block 66 the controller 38 evaluates data comprising the image. The controller 38 implements one more filtering algorithms at block 67 to detect or otherwise determine whether the data corresponds to at least one predetermined frequency range. In some examples, the controller 38 may execute at least one image recognition algorithm at block 68 to detect an object 30 or component 32 within the image associated with an object profile. In further examples, the controller 38 determines whether or not the object 30 or component 32 within the image is associated with the predetermined frequency range. It should be appreciated that blocks 67, 68 can be executed in either order depending on a particular situation.

At block 70 the controller 38 commands a display unit, such as a heads-up display unit 20, an instrument panel 18 or another display device 45, to present information to a vehicle occupant 14 if the controller 38 determines that the data corresponds to a waveform emitted at the predetermined frequency range. The information to be presented to the occupant 14 is selected to characterize an aspect of the object 30, such as an operational state, condition or presence of the object 30. For example, the information may indicate whether a traffic light is red, yellow or green.

Different occupants 14 may operate the vehicle 10 at different periods of time. In some examples, the controller 38 is configured to store one or more user profiles associated with each occupant 14, and may also be provided with at least one default user profile during system assembly. The default user profiles can be provided for each color, common colors, or combinations of colors such as red and yellow, for example. Each user profile includes information indicative of waveform(s) at a particular frequency that the occupant 14 is unable to, or has difficulty in, observing. The controller 38 accesses the user profile associated with the display preferences of the occupant 14 at block 72. The controller 38 considers predetermined frequencies associated with the user profile in the filtering algorithm at block 66.

In this example, the detection algorithm 60 is operable to receive a request from the occupant 14 to update a user profile associated with the predetermined frequency range at block 74. The request to update the profile can occur at any time during the execution of algorithm 60. Upon receiving the request to update the profile, the controller 38 accesses and updates the profile of the occupant 14 to indicate at least one frequency at block 76. Accordingly, the detection system 12 can accommodate the various conditions of occupants 14 who are colorblind.

At block 78 the information is displayed or otherwise provided to the occupant 14 in response to detecting data associated with the at least one predetermined frequency. In some examples, a projection unit 34 receives a command from the controller 38 to display the information, and projects the information onto a display surface 17. In other examples, the information is provided at other locations of the vehicle, including the instrumentation panel 18 and/or one or more other devices such as a display screen 24 provided with or adjacent to a rearview mirror 47. Of course, other techniques for presenting information to the occupant 14 are contemplated within the teachings of this disclosure. The algorithm 60 repeats any or all of the blocks 64-78 until execution of the algorithm terminates at step 80.

It is also contemplated that there can be more than one detection system 12 within vehicle 10 and/or more than one contiguous or non-contiguous display surface 17. The detection system 12 can include any number of sensors, including digital and/or analog devices such as a digital camera, to detect the emission of waveforms at any particular frequency of interest, and can be located at any suitable location.

Although the different examples have a specific component shown in the illustrations, embodiments of this disclosure are not limited to those particular combinations. It is possible to use some of the components or features from one of the examples in combination with features or components from another one of the examples. Also, although particular step sequences are shown, described, and claimed, it should be understood that steps may be performed in any order, separated or combined unless otherwise indicated and will still benefit from the present disclosure.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A controller for detecting a traffic device, comprising:
   an interface subsystem operable to receive an image from at least one camera;
   a command subsystem operable to command a display unit to communicate information on a display;

a comparison module operable to generate the information in response to detecting data within the image corresponding to visible light emitted in at least one predetermined frequency range, the at least one predetermined frequency range corresponding to a user profile;
wherein the user profile is a plurity of user profiles each corresponding to a different vehicle occupant; and
wherein the at least one predetermined frequency range includes a first predetermined frequency range corresponding to a first user profile of the plurality of user profiles and a second, different predetermined frequency range corresponding to a second user profile of the plurality of user profiles.

2. The controller as recited in claim 1, wherein the at least one predetermined frequency range includes at least two different frequency ranges each corresponding to a color, and each of the at least two frequency ranges corresponds to a different operating state of an object.

3. The controller as recited in claim 2, wherein the at least two frequency ranges correspond to radiation emitted by a traffic device.

4. The controller as recited in claim 1, wherein the controller is configured to detect an object within the image corresponding to the at least one predetermined frequency range and also corresponding to a geometry characterized by a traffic device.

5. The controller as recited in claim 4, wherein the comparison module is configured to set the at least one predetermined frequency range in the user profile.

6. A detection system for vehicle operation, comprising:
at least one camera operable to generate an image;
a display unit operable to communicate information on a display;
a controller coupled to the at least one camera, the controller being configured to command the display unit to communicate the information in response to detecting data within the image corresponding to visible light emitted in at least one predetermined frequency range, the controller being configured to set the at least one predetermined frequency range according to a user profile;
wherein the user profile is a plurlity of user profiles each corresponding to a different vehicle occupant; and
wherein the at least one predetermined frequency range includes a first predetermined frequency range corresponding to a first user profile of the plurality of user profiles and a second, different predetermined frequency range corresponding to a second user profile of the plurality of user profiles.

7. The detection system as recited in claim 6, wherein the display unit includes a projection unit operable to project information on the display, and the display includes a display screen configured to be positioned adjacent to a windshield.

8. The detection system as recited in claim 6, wherein the display is an instrumentation panel configured to be arranged in a vehicle cabin.

9. The detection system as recited in claim 6, wherein the at least one camera is a digital camera.

10. The detection system as recited in claim 6, wherein the controller is configured to detect an object within the image corresponding to the at least one predetermined frequency range and also corresponding to a geometry characterized by a traffic device.

11. The detection system as recited in claim 10, wherein the object corresponds to a geometry characterized by a traffic device.

12. The detection system as recited in claim 6, wherein the at least one predetermined frequency range includes at least two different frequency ranges each corresponding to a color, and each of the at least two frequency ranges corresponds to a different operating state of an object.

13. The detection system as recited in claim 6, wherein the information is distinct from color.

14. The detection system as recited in claim 6, wherein the information is one of a textual message and an audible signal each relating to the at least one predetermined frequency range.

15. A method of detecting a traffic device, comprising:
receiving an image from at least one camera;
detecting data within the image corresponding to visible light emitted in at least one predetermined frequency range, the at least one predetermined frequency range corresponding to a user profile;
commanding a display unit to communicate information onto a display in response to detecting the data;
accessing the user profilel to determine the at least one predetermined frequency range;
wherein the user profile is a plurality of user profiles each corresponding to a different vehicle occupant; and
wherein the at least one predetermined frequency range includes a first predetermined frequency range corresponding to a first user profile of the plurality of user profiles and a second, different predetermined frequency range corresponding to a second user profile of the plurality of user profiles.

16. The method as recited in claim 15, wherein the step of detecting includes identifying an object within the image.

17. The method as recited in claim 16, wherein the object emits radiation at the at least one predetermined frequency range.

18. The method as recited in claim 17, wherein the object corresponds to a geometry characterized by a traffic device.

19. The method as recited in claim 18, comprising arranging the at least one camera at an orientation defining a projection toward an expected position of the traffic device.

20. The method as recited in claim 15, wherein the at least one predetermined frequency range includes at least two different frequency ranges each corresponding to a color, and each of the at least two frequency ranges corresponds to a different operating state of an object.

21. The method as recited in claim 15, wherein the display unit is operable to project the information onto a display screen arranged adjacent to a windshield.

22. The method as recited in claim 15, comprising updating the at least one predetermined frequency range in response to receiving a user command.

23. The method as recited in claim 15, comprising:
setting the at least one predetermined frequency range in the first user profile; and
storing the plurality of user profiles in a memory location, each of the plurality of user profiles associated with one or more display preference settings; and
updating the at least one predetermined frequency range according to the second user profile subsequent to the step of detecting data within the image corresponding to visible light emitted in the at least one predetermined frequency range.

* * * * *